United States Patent [19]
Mowbray
[11] Patent Number: 4,464,099
[45] Date of Patent: Aug. 7, 1984

[54] FUEL INJECTION PUMPING APPARATUS

[75] Inventor: Dorian F. Mowbray, Burnham, England

[73] Assignee: Lucas Industries Public Limited Company, Birmingham, England

[21] Appl. No.: 396,325

[22] Filed: Jul. 8, 1982

[30] Foreign Application Priority Data

Jul. 9, 1981 [GB] United Kingdom ................ 8121230

[51] Int. Cl.³ ........................ F04B 7/00; F02M 41/06; F16H 25/14

[52] U.S. Cl. .................................... 417/510; 123/450; 74/55; 74/567; 92/129

[58] Field of Search ............... 417/460, 516, 517, 519, 417/510; 123/449, 450, 509; 92/129; 74/55, 567, 569

[56] References Cited

U.S. PATENT DOCUMENTS

| | | | |
|---|---|---|---|
| 1,159,178 | 11/1915 | Cook | 123/450 |
| 1,784,170 | 12/1930 | Benes | 123/450 |
| 2,243,861 | 6/1941 | Hawtzenroeder | 123/450 |
| 2,778,351 | 1/1957 | Links | 123/449 |
| 2,909,126 | 10/1959 | Gordon | 74/55 |
| 3,507,579 | 4/1970 | Kemp | 417/206 |

FOREIGN PATENT DOCUMENTS

| | | | |
|---|---|---|---|
| 155175 | 2/1954 | Australia | 123/450 |
| 1143013 | 4/1957 | France | 123/450 |

*Primary Examiner*—William L. Freeh
*Assistant Examiner*—Paul F. Neils

[57] ABSTRACT

A fuel injection pumping apparatus for supplying fuel to an internal combustion engine comprises a reciprocable plunger, a roller forming part of a tappet assembly and a cam for actuating the roller and plunger. The cam is formed on the outer peripheral surface of a cup-shaped member, which is supported about a spigot. A drive shaft is integral with the cup-shaped part.

6 Claims, 2 Drawing Figures

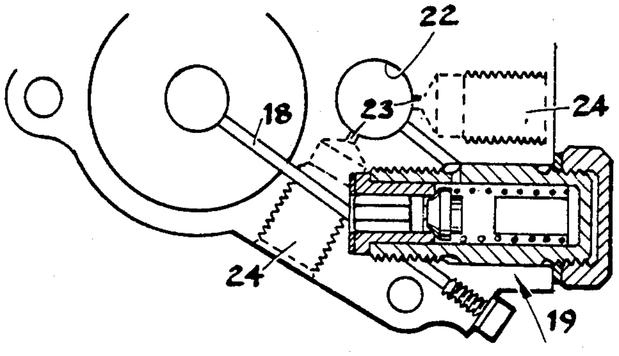
Fig. 2.
Fig. 1.
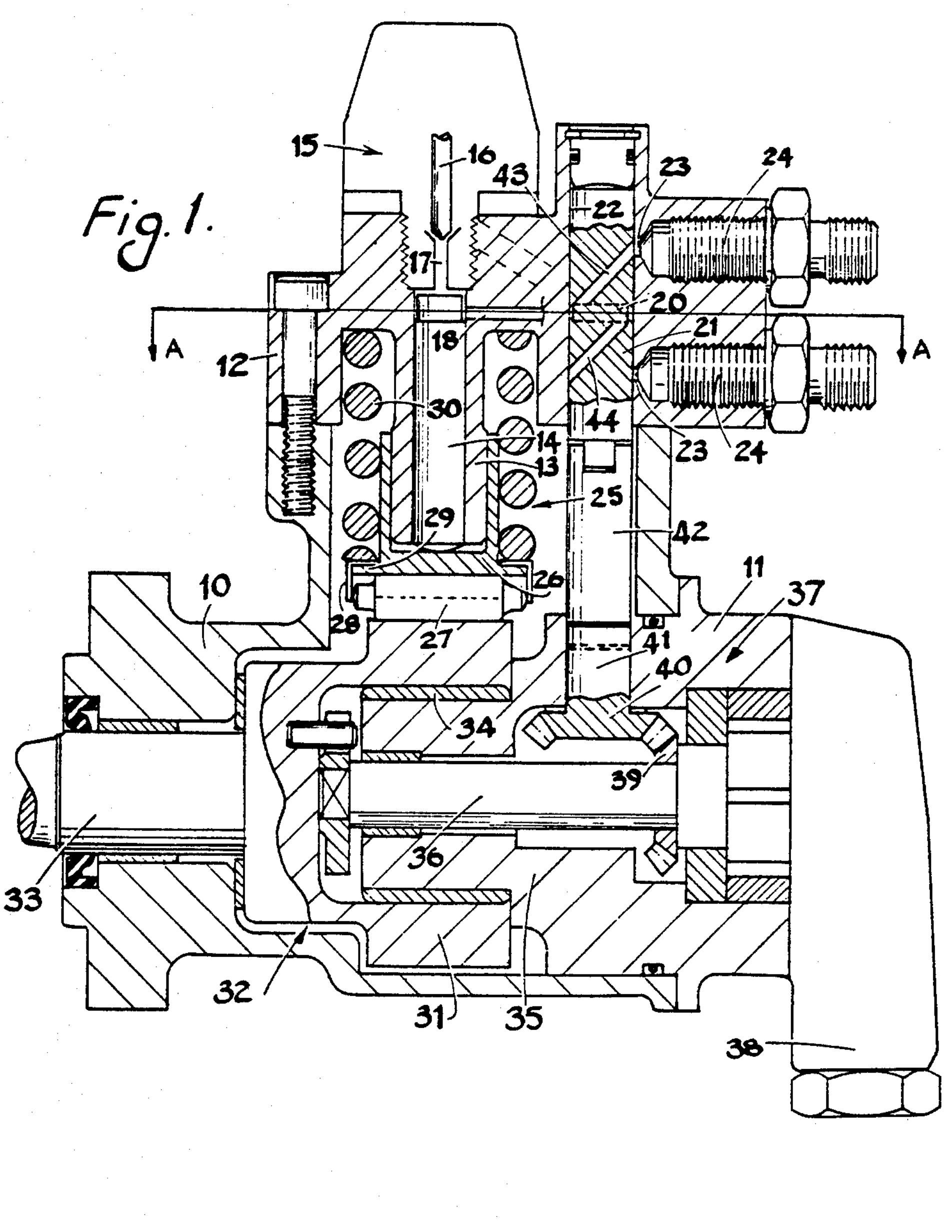

FUEL INJECTION PUMPING APPARATUS

This invention relates to a fuel injection pumping apparatus for supplying fuel to a compression ignition engine.

The development of compression ignition engines which has taken place over the last few years has made it possible to produce small high speed engines of the direct injection type. Such engines require fuel to be delivered at high pressure. A known form of fuel pumping apparatus has one pumping plunger for each engine cylinder and this type of apparatus known in the art as an "in-line" pump, is bulky and expensive and is not very flexible because of the difficulty of varying the timing of delivery of fuel. It is nevertheless capable of supplying fuel at the desired pressure. Another form of apparatus known in the art as a "distributor" pump has in effect one injection pump which delivers fuel in turn to the cylinders of the associated engine by means of a rotary distributor member. Owing to leakage problems it is difficult to arrange for a distributor pump of the conventional type to supply fuel at the required high pressure, however, the timing of delivery of fuel by a distributor member can be readily varied.

The object of the present invention is to provide a fuel injection pumping apparatus in a simple and convenient form.

According to the invention a fuel injection pumping apparatus comprises a plunger slidable within a bore, an outlet for high pressure fuel from said bore, a cam shaft rotably mounted with a housing of the apparatus and a tappet assembly including a roller engageable with a cam on the cam shaft to effect inward movement of the plunger against the action of resilient means, said cam shaft comprising a cup-shaped part having a cam profile on the exterior surface of the skirt portion, a bearing surface defined by the internal peripheral surface of the skirt portion, a drive shaft coupled to said cup-shaped part and a spigot member defined by the housing of the apparatus, said spigot member providing support for said cup-shaped part.

An example of a fuel pumping apparatus in accordance with the invention will now be described with reference to the accompanying drawings in which:

FIG. 1 is a sectional side elevation of the apparatus; and

FIG. 2 is a section of the line A—A of FIG. 1.

Referring to the drawings the apparatus comprises a first housing part 10 having a hollow interior and an opening to receive a second housing part 11. A third housing part 12 is secured to the housing part 10 and defines a pump barrel 13 defining a bore which accommodates a pumping plunger 14. The open end of the bore is closed by a valve generally indicated at 15 and which includes a valve member 16 which can be urged onto a seating to prevent flow of fuel through a passage 17 which communicates with the pumping chamber defined by the bore and the plunger. A fuel outlet passage 18 is connected to the pumping chamber and this communicates by way of an unloading delivery valve 19, with a circumferential groove 20 which is formed in the peripheral surface of a rotary distributor member 21. The distributor member 21 is housed within a bore 22 formed in the housing part 12 and opening into the bore at different positions, are ports 23 which communicates with fuel outlet ports 24. The outlet ports in use, are connected to the fuel injection nozzles respectively of the associated engine.

The plunger 14 is engaged by a tappet assembly indicated at 25 and which includes a cup-shaped part 26 in the base wall of which is formed a groove of part-circular section and in which is located a roller 27 the groove extends through more than 180° so that the roller is captive within the groove and end location of the roller is provided by a retaining member 28 of annular form and which has a downwardly extending wall which engages with the ends of the roller 27. The retaining member is trapped against a flange 29 on the part 26 by means of a coiled compression spring 30. The skirt of the part 26 is slidably supported about the pump barrel 13 and the skirt is made as thin as possible to reduce its weight.

The roller engages cam lobes indicated at 31, which form part of a cam shaft. The cam shaft includes a cup-shaped part 32 from the base wall of which extends an integral drive shaft 33. The shaft 33 extends to the exterior of the housing of the apparatus and is supported in the first housing part, and in use is connected to a member which is driven in timed relationship with the associated engine. The internal surface of the skirt of the cup-shaped part forms a bearing surface which is supported about a bearing sleeve 34 carried upon a spigot 35 which is formed as part of the housing part 11.

The spigot 35 is hollow and accommodates a subsidiary drive shaft 36 which is coupled to the base of the cup-shaped part 32 and which is connected to the rotary part of a fuel supply pump 37 housed within the housing part 11. The pump 37 has an outlet not shown, which is connected by way of the valve 15 to the passage 17 and it has an inlet 38 which is connected to a source of fuel. A relief valve is provided to control the outlet pressure of the pump 37.

In addition, the subsidiary drive shaft supports a bevel gear 39 which meshes with a similar gear 40 mounted on a shaft 41 which is rotably supported in the housing part 11. The shaft 41 is coupled to the distributor member 21 by means of a coupling rod 42.

In operation, as the drive shaft is rotated the distributor member 21 will also rotate at the same speed. The number of cams 31 is equal to the number of engine cylinders so that for each revolution of the shaft 33, fuel will be delivered to each engine cylinder in turn. The plunger 14 is shown in FIG. 1 in its uppermost position and fuel will have been supplied because the valve member 16 is closed on its seating, by way of the passage 18 and the delivery valve 19 to the circumferential groove 20. The distributor member in the particular example, is provided with two internal drillings 43, 44. The drillings are in constant communication at one end with the circumferential groove 20 and at their other ends are positioned so that one of the drillings can register with three of the ports 23 in turn, the other drilling being positioned so that it can register with the other three ports 23 in turn, the registration occurring at the appropriate time so that fuel is supplied in turn to the engine cylinders.

As the cam shaft rotates from the position shown in FIG. 1, the tappet assembly under the action of the spring 30 will move downwardly and at this time the valve 15 is energised to lift the valve member 16 from its seating. Fuel under pressure can therefore flow to the bore containing the plunger 14 causing the plunger 14 to move downwardly following the tappet assembly. In addition, the distributor member will have rotated so that the port 23 which was in communication with either one of the grooves 43 or 44 will be moved out of communication therewith. When the plunger has moved downwardly its maximum extent, further rotation of the cam shaft will effect upward movement of the plunger and in order for fuel to be delivered through the passage 18, the valve member 16 must be closed onto its seating. If the valve is not closed then no fuel will be delivered by the apparatus, the fuel being returned to the outlet of the pump 37. If however the valve 16 is closed then the fuel will be pressurised by the movement of the plunger a sufficient amount to effect opening of the delivery valve 19 and flow of fuel to the appropriate one of the ports 23 and the associated outlet 24.

The operation of the valve 15 is controlled by an electronic control circuit (not shown). This circuit decides on the basis of the information supplied to it, when during the inward movement of the plunger, the valve member 16 is to be closed onto its seating to achieve delivery of fuel. It also decides how long in terms of the movement of the plunger, the valve member should remain closed. It is therefore possible to vary both the timing of delivery of fuel to the engine and also the quantity of fuel which is delivered.

The pump as described is capable of delivering fuel to a six cylinder engine and in order to provide for the required variation in fuel quantity and the timing adjustment, the cams must provide the required lift. The cam loading will therefore be high but the cam shaft is adequately supported by means of the spigot 35 and the cam shaft itself is short and robust. It has already been mentioned that the tappet assembly 25 is as light as possible. This helps to reduce the required spring force and the cam loading. The leakage of fuel is reduced to a minimum by the fact that a plunger 14 has a continuous surface as a result the loading on the plunger is balanced thereby minimising the risk of seizure.

In the particular example a single delivery valve 19 is provided. This is of the conventional design and provides unloading of the pipe lines which connect the outlets 24 with the injection nozzles. It is possible that each outlet 24 will have to incorporate a valve to ensure that the column of fuel between the delivery valve and the outlet 24 is properly stabilised before the drillings 43 or 44 move out of communication with the respective port 23.

If desired the single delivery valve 19 can be replaced by similar delivery valves in the outlets 24 respectively.

It will be noted that the outlets 24 are disposed at two levels. This permits the distributor member 21 to be smaller in diameter and still provide the correct port area, than would be the case if the outlets were at the same level. This reduces the leakage of fuel at the distributor member.

I claim:

1. A fuel injection pumping apparatus for supplying fuel to a compression ignition engine comprising a pump inlet, a plunger slidable within a bore, an outlet for high pressure fuel from said bore, a cam shaft rotatably mounted within a housing of the apparatus formed in at least a first housing part defining an opening and a second housing part closing said opening, and a tappet assembly including a roller engageable with a cam on the cam shaft to effect inward movement of the plunger against the action of resilient means, said cam shaft comprising a cup-shaped part having a cam profile on the exterior surface of a skirt portion thereof, said first housing part having a hollow interior to accommodate said cup-shaped part, a bearing surface defined by the internal peripheral surface of the skirt portion, a drive shaft integral with said cup-shaped part supported in said first housing part, a hollow spigot member defined by said second housing part, said spigot member providing support for said cup-shaped part, an auxiliary drive shaft located in said spigot, a low pressure fuel pump mounted in the second housing part, one end of said auxiliary drive shaft being connected to a rotary part of the low pressure pump, and coupling means connecting the other end of the auxiliary drive shaft to said cup-shaped part.

2. An apparatus according to claim 1 including a third housing portion, said third housing portion being secured to said first housing portion and defining a pump barrel in which is defined said bore, a rotary distributor member mounted in the third housing portion and a plurality of outlet ports formed in the third housing portion, said distributor member acting to connect said outlet in turn to said outlet ports.

3. An apparatus according to claim 1 including a bevel gear carried on said auxiliary drive shaft, said second body portion mounting a further bevel gear which is engaged with said first mentioned bevel gear to provide a drive to a rotary distributor member.

4. An apparatus according to claim 3 in which said rotary distributor acts to distribute fuel delivered through said outlet during successive inward movements of the plunger, to outlet ports in turn.

5. An apparatus according to any one of the claims 1, 3 or 4 in which said bore is defined in a pump barrel, sad tappet assembly comprising a cup-shaped tappet part slidable about said pump barrel, said cup-shaped tappet part defining a groove to accommodate said roller.

6. An apparatus according to claim 5 including a flange on said cup-shaped tappet part, a coiled compression spring acting on said tappet part to maintain the roller in contact with the cam and an annular retaining member positioned between the flange and one end of said spring, said retaining member having a wall portion which engages with the ends of the roller to retain the roller within the groove.

* * * * *